United States Patent
Zhang et al.

(10) Patent No.: US 10,628,694 B2
(45) Date of Patent: Apr. 21, 2020

(54) FINGERPRINT ENROLLING METHOD, APPARATUS, AND TERMINAL DEVICE

(71) Applicant: Guangdong Oppo Mobile Telecommunications Corp., Ltd., Dongguan, Guangdong (CN)

(72) Inventors: Qiang Zhang, Guangdong (CN); Lizhong Wang, Guangdong (CN); Haitao Zhou, Guangdong (CN); Kui Jiang, Guangdong (CN); Wei He, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 113 days.

(21) Appl. No.: 15/934,316

(22) Filed: Mar. 23, 2018

(65) Prior Publication Data
US 2018/0211125 A1 Jul. 26, 2018

Related U.S. Application Data

(63) Continuation of application No. PCT/CN2016/093749, filed on Aug. 5, 2016.

(30) Foreign Application Priority Data

Oct. 19, 2015 (CN) .......................... 2015 1 0681089

(51) Int. Cl.
*G06K 9/00* (2006.01)
*G06K 9/03* (2006.01)

(52) U.S. Cl.
CPC ........... *G06K 9/00926* (2013.01); *G06K 9/00* (2013.01); *G06K 9/00013* (2013.01); *G06K 9/00087* (2013.01); *G06K 9/036* (2013.01)

(58) Field of Classification Search
CPC ...... G06K 9/00; G06K 9/001; G06K 9/00013; G06K 9/00114; G06K 9/0012;
(Continued)

(56) References Cited

U.S. PATENT DOCUMENTS 5,982,913 A * 11/1999 Brumbley .......... G06K 9/00087
382/124
2002/0034319 A1* 3/2002 Tumey ............... G06K 9/00087
382/116

(Continued)

FOREIGN PATENT DOCUMENTS

CN 1698066 A 11/2005
CN 101233529 A 7/2008
(Continued)

OTHER PUBLICATIONS

International Search Report issued in corresponding international application No. PCT/CN2016/093749 dated Nov. 2, 2016.
(Continued)

*Primary Examiner* — Dwayne D Bost
*Assistant Examiner* — Stephen M Brinich
(74) *Attorney, Agent, or Firm* — Young Basile Hanlon & MacFarlane, P.C.

(57) ABSTRACT

A fingerprint enrolling method, a fingerprint enrolling apparatus, and a terminal device are provided. The method includes the following operations. Whether an image-quality fluctuation amplitude of fingerprint images of a user exceeds a preset image-quality fluctuation threshold or image-quality fluctuation threshold range is determined according to image quality of a current fingerprint image of the user currently acquired and image quality of a historical fingerprint image of the user previously acquired. The current fingerprint image is enrolled into a fingerprint database based on a determination that the image-quality fluctuation amplitude
(Continued)

does not exceed the image-quality fluctuation threshold or the image-quality fluctuation threshold range.

17 Claims, 4 Drawing Sheets

(58) Field of Classification Search
CPC ............ G06K 9/0014; G06K 9/00899; G06K 9/00885; G06K 9/00926
USPC .......................... 382/124–128, 115–116, 100
See application file for complete search history.

(56) References Cited

U.S. PATENT DOCUMENTS

| | | | |
|---|---|---|---|
| 2003/0091724 A1 | 5/2003 | Mizoguchi | |
| 2003/0123715 A1* | 7/2003 | Uchida | G06K 9/00026 382/124 |
| 2003/0179909 A1* | 9/2003 | Wong | G06K 9/00026 382/115 |
| 2003/0197593 A1 | 10/2003 | Siegel et al. | |
| 2005/0129290 A1 | 6/2005 | Lo et al. | |
| 2010/0119126 A1* | 5/2010 | Rane | G06K 9/00067 382/125 |
| 2015/0092996 A1 | 4/2015 | Tian | |

FOREIGN PATENT DOCUMENTS

| | | |
|---|---|---|
| CN | 103077379 A | 5/2013 |
| CN | 103093209 A | 5/2013 |
| CN | 103679666 A | 3/2014 |
| CN | 104463141 A | 3/2015 |
| CN | 104809452 A | 7/2015 |
| CN | 104809453 A | 7/2015 |
| CN | 105303174 A | 2/2016 |
| JP | 2002032757 A | 1/2002 |

OTHER PUBLICATIONS

Extended European search report issued in corresponding European application No. 16856725.3 dated Jun. 20, 2018.
Biagio Freni et al: "Online and Offline Fingerprint Template Update Using Minutiae: An Experimental Comparison", AMDO 2008, LNCS 5098, pp. 441-448, 2008.
Ricardo Garcia Noval et al: "Adaptative Templates in Biometric Authentication", WSCG2008 Poster papers, Feb. 4, 2008, pp. 37-40.
Ko T et al: "Monitoring and Reporting of Fingerprint Image Quality and Match Accuracy for a Large User Application", Proceedings of the 33rd Applied Imagery Pattern Recognition Workshop (AIPR'04), Oct. 13, 2004.
Tobias Scheidat et al: "Automatic Template Update Strategies for Biometrics", Otto-von-Guericke University of Magdeburg, Advanced Multimedia and Security Lab, Technical report, May 1, 2007.
Ser W et al: "Online fingerprint template improvement", Aug. 1, 2002, IEEE Transactions on Pattern Analysis and Machine Intelligence, vol. 24, No. 8, pp. 1121-1126.
Ratha N K et al: "Adaptive flow orientation-based feature extraction in fingerprint images", Nov. 1, 1995, XP004000975.
Summons to Oral Proceedings issued in corresponding European application No. 16856725.3 dated Oct. 15, 2019.

* cited by examiner

WHETHER AN IMAGE-QUALITY FLUCTUATION AMPLITUDE OF A FINGERPRINT IMAGE OF A USER EXCEEDS A PRESET IMAGE-QUALITY FLUCTUATION THRESHOLD OR IMAGE-QUALITY FLUCTUATION THRESHOLD RANGE IS DETERMINED ACCORDING TO IMAGE QUALITY OF A CURRENT FINGERPRINT IMAGE OF THE USER CURRENTLY ACQUIRED AND IMAGE QUALITY OF A HISTORICAL FINGERPRINT IMAGE OF THE USER PREVIOUSLY ACQUIRED. ~11

THE CURRENT FINGERPRINT IMAGE IS ENROLLED INTO A FINGERPRINT DATABASE BASED ON A DETERMINATION THAT THE IMAGE-QUALITY FLUCTUATION AMPLITUDE DOES NOT EXCEED THE IMAGE-QUALITY FLUCTUATION THRESHOLD OR THE IMAGE-QUALITY FLUCTUATION THRESHOLD RANGE. ~12

FIG. 1

FINGERPRINT ENROLLING METHOD, APPARATUS, AND TERMINAL DEVICE

CROSS-REFERENCE TO RELATED APPLICATION(S)

This application is a continuation of International Application PCT/CN2016/093749, filed on Aug. 5, 2016, which claims priority to Chinese Patent Application No. 201510681089.7, filed on Oct. 19, 2015, the contents of both of which are hereby incorporated by reference in their entireties.

TECHNICAL FIELD

The present disclosure relates to the field of fingerprint recognition technology, and particularly to a fingerprint enrolling method, a fingerprint enrolling apparatus, and a terminal device.

BACKGROUND

With the rapid development of biometrics, fingerprint recognition is increasingly used in business and people's daily life. Among them, how to enroll high-quality fingerprint images has become an important issue to improve the success rate of fingerprint recognition.

In the related art, fingerprint images are usually enrolled on the same finger for multiple times, and then image quality of each enrolled fingerprint image is calculated. Fingerprint images whose image quality exceeds a preset threshold will be enrolled into a fingerprint database for subsequent fingerprint recognition.

However, ridges of some people's fingers are not clear, and the image quality of fingerprint images acquired using the above method is relatively low and thus fails to reach the preset threshold, consequently, fingerprints of these people cannot be enrolled into the fingerprint database. The fingerprints of these people may be enrolled into the fingerprint database if the above mentioned preset threshold is decreased, which in turn cause that a large number of low-quality fingerprint images are enrolled into the fingerprint database, resulting in higher false reject rate and false accept rate.

BRIEF DESCRIPTION OF THE DRAWINGS

FIG. 1 is a schematic flowchart illustrating a fingerprint enrolling method according to a first implementation of the present disclosure.

DETAILED DESCRIPTION

Figure 2:
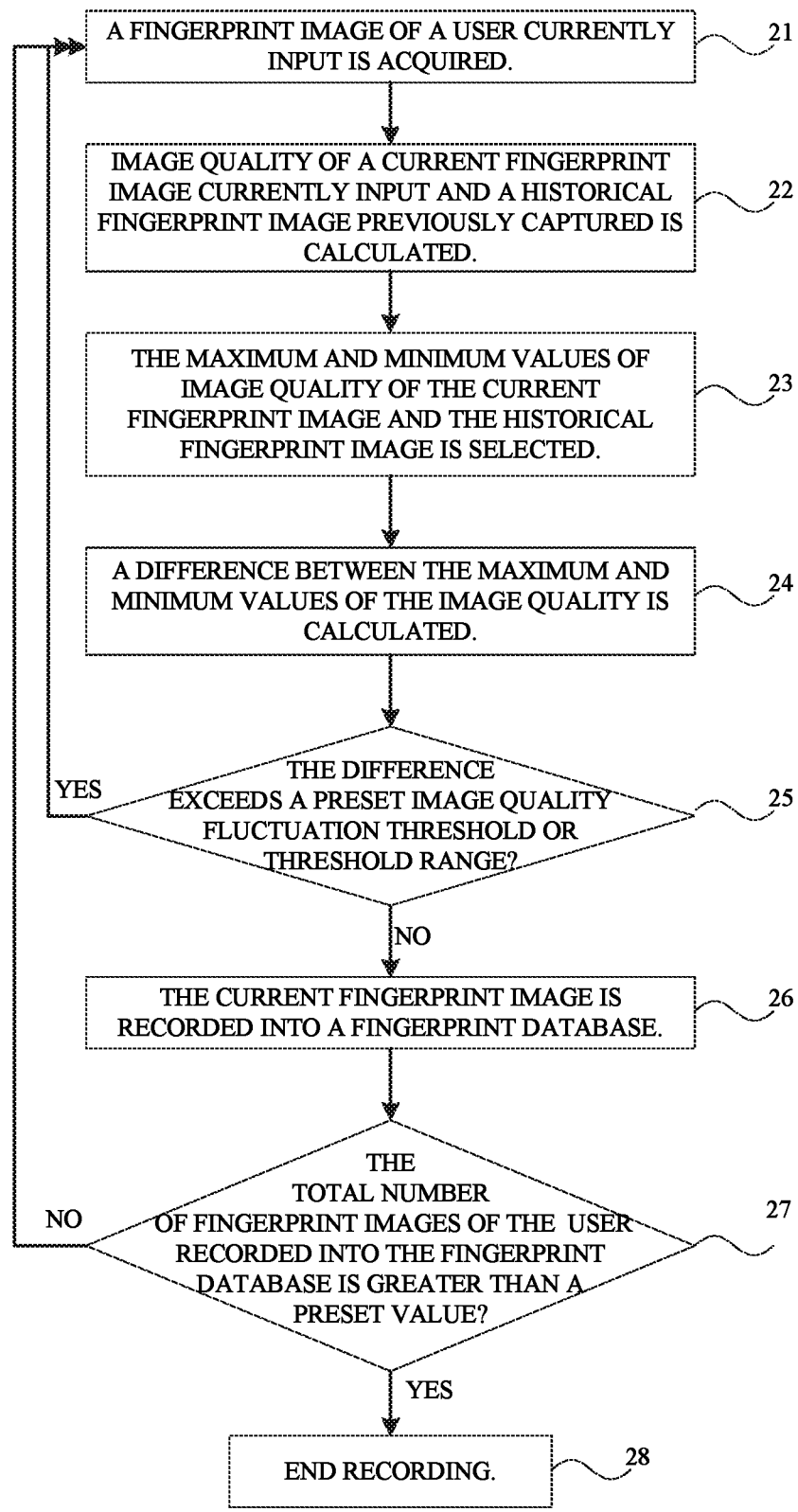
FIG. 2 is a schematic flowchart illustrating a fingerprint enrolling method according to a second implementation of the present disclosure.

Implementations of the present disclosure are further described in detail below with reference to the accompanying drawings. It should be noted that, the implementations described herein are merely used to explain rather than to limit the present disclosure. In addition, to facilitate description, only part of structures related to the present disclosure is illustrated in the accompanying drawings.

A fingerprint enrolling method is provided. The method includes the following operations. Whether an image-quality fluctuation amplitude of fingerprint images of a user exceeds a preset image-quality fluctuation threshold or image-quality fluctuation threshold range is determined according to the image quality of a current fingerprint image of the user currently acquired and image quality of a historical fingerprint image of the user previously acquired. The current fingerprint image is enrolled into a fingerprint database when the image-quality fluctuation amplitude does not exceed the image-quality fluctuation threshold or the image-quality fluctuation threshold range.

In one implementation, the image-quality fluctuation amplitude of fingerprint images of the user is a difference between the maximum and minimum values of image quality of the current fingerprint image and the historical fingerprint image.

In one implementation, the method further includes returning to acquiring the current fingerprint image when the image-quality fluctuation amplitude exceeds the image-quality fluctuation threshold or the image-quality fluctuation threshold range.

In one implementation, the method further includes the following after enrolling the current fingerprint image into the fingerprint database. Determine whether the total number of fingerprint images of the user enrolled into the fingerprint database reaches a preset value. End the enrolling when the total number reaches the preset value, or return to acquiring the current fingerprint image when the total number is less than the preset value.

In one implementation, the image quality is determined based on an average value of grayscale or an average variance of grayscale corresponding to the fingerprint image.

In one implementation, the method further includes the following before enrolling the current fingerprint image into the fingerprint database. An image acquiring threshold of the fingerprint database is preset. The image acquiring threshold is set to be a preset value.

In one implementation, the historical fingerprint image includes one or more fingerprint images acquired before acquiring the current fingerprint image.

A fingerprint enrolling apparatus is provided. The apparatus includes a first determining unit and an enrolling unit. The first determining unit is configured to determine, according to the image quality of a current fingerprint image of a user currently acquired and image quality of a historical fingerprint image of the user previously acquired, whether an image-quality fluctuation amplitude of fingerprint images of the user exceeds a preset image-quality fluctuation threshold or image-quality fluctuation threshold range. The enrolling unit is configured to enroll the current fingerprint image into a fingerprint database when the first determining unit determines that the image-quality fluctuation amplitude does not exceed the image-quality fluctuation threshold or the image-quality fluctuation threshold range.

In one implementation, the image-quality fluctuation amplitude of fingerprint images of the user is a difference between the maximum and minimum values of image quality of the current fingerprint image and the historical fingerprint image.

In one implementation, the apparatus further includes a controlling unit. The controlling unit is configured to return to acquiring the current fingerprint image when the first determining unit determines that the image-quality fluctuation amplitude exceeds the image-quality fluctuation threshold or the image-quality fluctuation threshold range.

In one implementation, the apparatus further includes a second determining unit, an ending unit, and a second returning unit. The second determining unit is configured to determine, after the enrolling unit enrolls the current fingerprint image into the fingerprint database, whether the total number of fingerprint images of the user enrolled into the fingerprint database reaches a preset value. The ending unit is configured to end the enrolling when the second determining unit determines that the total number of the fingerprint images enrolled into the fingerprint database reaches the preset value. The second returning unit is configured to return to acquiring the current fingerprint image when the second determining unit determines that the total number of the fingerprint images enrolled into the fingerprint database is less than the preset value.

In one implementation, the image quality is determined based on an average value of grayscale or an average variance of grayscale corresponding to the fingerprint image.

In one implementation, the historical fingerprint image includes one or more fingerprint images acquired before acquiring the current fingerprint image.

A terminal device is provided. The device includes a memory and a processor. The memory is configured to store executable program codes. The processor is configured to be coupled with the memory. The processor is configured to invoke the executable program codes stored in the memory to execute the following operating instructions.

Whether an image-quality fluctuation amplitude of fingerprint images of a user exceeds a preset image-quality fluctuation threshold or image-quality fluctuation threshold range is determined according to the image quality of a current fingerprint image of the user currently acquired and image quality of a historical fingerprint image of the user previously acquired. The current fingerprint image is enrolled into a fingerprint database when the image-quality fluctuation amplitude does not exceed the image-quality fluctuation threshold or the image-quality fluctuation threshold range.

In one implementation, the image-quality fluctuation amplitude of fingerprint images of the user is a difference between the maximum and minimum values of image quality of the current fingerprint image and the historical fingerprint image.

In one implementation, the processor is further configured to return to acquiring the current fingerprint image when the image-quality fluctuation amplitude exceeds the image-quality fluctuation threshold or the image-quality fluctuation threshold range.

In one implementation, the processor is further configured to determine, after enrolling the current fingerprint image into the fingerprint database, whether the total number of fingerprint images of the user enrolled into the fingerprint database reaches a preset value. The processor is further configured to end the enrolling when the total number reaches the preset value, otherwise, return to acquiring the current fingerprint image when the total number is less than the preset value.

In one implementation, the processor is further configured to preset an image acquiring threshold of the fingerprint database and set the image acquiring threshold to be a preset value, before enrolling the current fingerprint image into the fingerprint database.

In one implementation, the image quality is determined based on an average value of grayscale or an average variance of grayscale corresponding to the fingerprint image.

In one implementation, the historical fingerprint image includes one or more fingerprint images acquired before acquiring the current fingerprint image.

The fingerprint enrolling method of the implementations of the disclosure may be implemented by the fingerprint enrolling apparatus or a terminal device (for example, smart phones, tablets, etc.) integrated with the fingerprint enrolling apparatus. The fingerprint enrolling apparatus can be implemented by hardware or software.

First Implementation

FIG. 1 is a schematic flowchart illustrating a fingerprint enrolling method according to a first implementation of the present disclosure. As illustrated in FIG. 1, the method includes the following operations.

At block 11, whether an image-quality fluctuation amplitude of fingerprint images of a user exceeds a preset image-quality fluctuation threshold or image-quality fluctuation threshold range is determined according to the image quality of a current fingerprint image of the user currently acquired and image quality of a historical fingerprint image of the user previously acquired.

As one implementation, fingerprint images can be acquired via a fingerprint acquiring device, such as a fingerprint identification module or a fingerprint sensor, examples of which include but not limited to a capacitive fingerprint sensor, an optical fingerprint sensor, and the like.

The historical fingerprint image may include one or more fingerprint images acquired before acquiring the current fingerprint image. Thus, the historical fingerprint image may refer a set of fingerprint images.

The preset image-quality fluctuation threshold is a concrete value and the preset image-quality fluctuation threshold range is a numerical range. The image-quality fluctuation threshold or image-quality fluctuation threshold range can be set when a product (such as a terminal or mobile terminal, a fingerprint sensor, or even a component equipped with the fingerprint enrolling function provided herein) is shipped from the factory, or can be set when the product is initialized.

Exemplarily, based on the above-mentioned implementation, the image quality can be determined based on an average value of grayscale or an average variance of grayscale corresponding to the fingerprint image. As another example, the image quality can be obtained through Fast Fourier transform (FFT).

As one implementation, the image quality of the current fingerprint image and image quality the historical fingerprint image are calculated respectively. According to the calculated image quality, whether the image-quality fluctuation amplitude exceeds the preset image-quality fluctuation threshold or image-quality fluctuation threshold range is determined. Different from the related art where the image quality of each fingerprint image is compared with a preset threshold, in implementations of the disclosure, the image-quality fluctuation amplitude rather than the image quality is compared with the fluctuation threshold or fluctuation threshold range.

At block 12, the current fingerprint image is enrolled into a fingerprint database when the image-quality fluctuation amplitude does not exceed the image-quality fluctuation threshold or the image-quality fluctuation threshold range.

When the image-quality fluctuation amplitude does not exceed the image-quality fluctuation threshold or the image-quality fluctuation threshold range, it means that the image quality of the current fingerprint image is not much different from that of the historical fingerprint image and therefore the current fingerprint image can be used for fingerprint recognition. As a result, the current fingerprint image is enrolled into the fingerprint database.

According to the implementation, whether the image-quality fluctuation amplitude exceeds the preset image-quality fluctuation threshold or image-quality fluctuation threshold range is determined according to the image quality of the current fingerprint image and the historical fingerprint image, and the current fingerprint image is enrolled into the fingerprint database when the image-quality fluctuation amplitude does not exceed the image-quality fluctuation threshold or the image-quality fluctuation threshold range. For users having unclear fingerprint ridges, fingerprint images can be acquired for multiple times, and even the image quality of the current fingerprint image is not good (such as less than a preset threshold), as long as the image-quality fluctuation amplitude of fingerprint images does not exceed the preset image-quality fluctuation threshold or image-quality fluctuation threshold range, the fingerprint image currently acquired can be enrolled into the fingerprint database. Consequently, it is possible to enroll the fingerprint images of users having unclear fingerprint ridges, and guarantee image quality of fingerprint images of normal fingers enrolled into the database.

Exemplarily, on the basis of the above implementations, the image-quality fluctuation amplitude of fingerprint images of the user is a difference between the maximum and minimum values of image quality of the current fingerprint image and the historical fingerprint image. In case the historical fingerprint image is a single fingerprint image, the image-quality fluctuation amplitude of fingerprint images of the user is a difference between two values of image quality of the current fingerprint image and the single historical fingerprint image.

Exemplarily, based on the implementation mentioned above, the method may further include the following.

Return to acquiring the current fingerprint image when the image-quality fluctuation amplitude exceeds the image-quality fluctuation threshold or the image-quality fluctuation threshold range.

As one implementation, when the image-quality fluctuation amplitude exceeds the image-quality fluctuation threshold or the image-quality fluctuation threshold range, it indicates that the fingerprint image currently acquired has larger image-quality fluctuation amplitude and may be obtained via non-standard operation during acquiring. As a result, the fingerprint image currently acquired will not be enrolled into the fingerprint database and the method will return to acquiring the current fingerprint image to re-acquire a fingerprint image.

Exemplarily, on the basis of the foregoing implementation, the method further includes the following after enrolling the current fingerprint image into the fingerprint database.

Whether the total number of fingerprint images of the user enrolled into the fingerprint database reaches a preset value is determined.

End the enrolling when the total number reaches (for example, equal to or greater than) the preset value, or return to acquiring the current fingerprint image when the total number is less than the preset value. By setting the preset value representing the storing capability of the fingerprint database or memory, redundant fingerprint acquiring and enrolling operations can be avoided, which can save memory space, improve processor speed, and help to stabilize the system.

The preset value can be customized, for example, it can be set as 3, 5, 10 or the like. When the number of the fingerprint images of the user enrolled into the fingerprint database reaches the preset value, the enrolling will be ended; otherwise, when the number of the fingerprint images of the user enrolled into the fingerprint database is less than the preset value, return to acquiring the current fingerprint image and continue enrolling.

According to the aforementioned implementations, according to the image quality of the current fingerprint image and the historical fingerprint image, whether the image-quality fluctuation amplitude exceeds the preset image-quality fluctuation threshold or image-quality fluctuation threshold range is determined, and the current fingerprint image is then enrolled into the fingerprint database when the image-quality fluctuation amplitude does not exceed the image-quality fluctuation threshold or the image-quality fluctuation threshold range. For users having unclear fingerprint ridges, fingerprint images can be acquired for multiple times, and as long as the image-quality fluctuation amplitude of fingerprint images does not exceed the preset image-quality fluctuation threshold or image-quality fluctuation threshold range, the fingerprint image currently acquired can be enrolled into the fingerprint database. As a result, the aforementioned implementation can also enable enrolling fingerprint images of users having unclear fingerprint ridges, and thus guaranteeing the image quality of fingerprint images of normal fingers enrolled into the database.

Second Implementation

FIG. 2 is a schematic flowchart illustrating a fingerprint enrolling method according to a second implementation of the present disclosure. The implementation is an exemplary implementation to describe the technical solutions of the disclosure in detail. As illustrated in FIG. 2, the method includes the following.

At block 21, a fingerprint image currently input by a user is acquired. A fingerprint sensor can be used to conduct this operation.

At block 22, the image quality of a current fingerprint image currently acquired and a historical fingerprint image previously acquired is calculated via a counter or counting circuit for example.

At block 23, the maximum and minimum values of image quality of the current fingerprint image and the historical fingerprint image are selected or determined via a comparator or a logic comparison circuit for example.

At block 24, a difference between the maximum and minimum values of the image quality is calculated via a calculator for example.

At block 25, whether the difference exceeds a preset image-quality fluctuation threshold or image-quality fluctuation threshold range is determined by a comparator or a logic comparison circuit for example.

When the difference does not exceed an image-quality fluctuation threshold or an image-quality fluctuation threshold range, proceed to block 26; when the difference exceeds the image-quality fluctuation threshold or the image-quality fluctuation threshold range, return to block 21.

At block 26, the current fingerprint image is enrolled into a fingerprint database; proceed to block 27.

At block 27, whether or not the total number of fingerprint images of the user enrolled into the fingerprint database reaches a preset value is determined by a comparator or a logic comparison circuit for example.

When the total number reaches the preset value, proceed to block 28; when the total number is less than the preset value, return to block 21.

At block 28, enrolling is ended.

In this implementation, first determine, according to the image quality of the current fingerprint image and the historical fingerprint image, whether the image-quality fluctuation amplitude exceeds the preset image-quality fluctuation threshold or image-quality fluctuation threshold range, and when the image-quality fluctuation amplitude does not exceed the image-quality fluctuation threshold or the image-quality fluctuation threshold range, the current fingerprint image will be enrolled into the fingerprint database. For users having unclear fingerprint ridges, fingerprint images can be acquired for multiple times, and as long as the image-quality fluctuation amplitude does not exceed the preset image-quality fluctuation threshold or image-quality fluctuation threshold range, the fingerprint image currently acquired can be enrolled into the fingerprint database. Therefore, the fingerprint images of users having unclear fingerprint ridges can be enrolled and image quality of fingerprint images of normal fingers enrolled into the database can be further guaranteed.

Third Implementation

Figure 3:
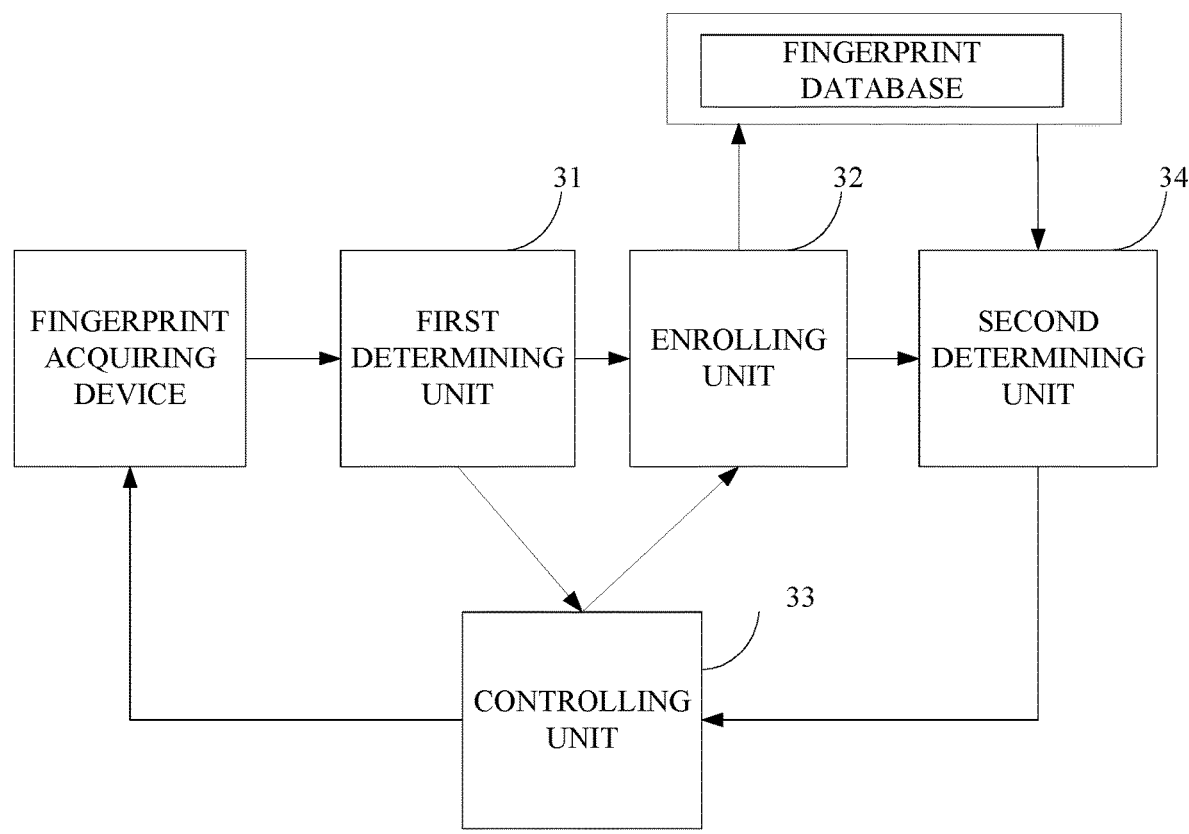
FIG. 3 is a schematic structural diagram illustrating a fingerprint enrolling apparatus according to a third implementation of the present disclosure.

FIG. 3 is a schematic structural diagram illustrating a fingerprint enrolling apparatus according to a third implementation of the present disclosure. As illustrated in FIG. 3, the apparatus includes a first determining unit 31 and an enrolling unit 32.

The first determining unit 31 is configured to determine, according to image quality of a current fingerprint image of a user currently acquired and image quality of a historical fingerprint image of the user previously acquired, whether an image-quality fluctuation amplitude of fingerprint images of the user exceeds a preset image-quality fluctuation threshold or image-quality fluctuation threshold range. The first determining unit 31 can be implemented with a comparator or logic comparison circuit for example.

As one implementation, the first determining unit 31 can be a component equipped with calculating and comparing functions, such as a processor integrated with a calculator and a comparator.

The enrolling unit 32 is configured to enroll the current fingerprint image into a fingerprint database of a memory when the first determining unit determines that the image-quality fluctuation amplitude does not exceed the image-quality fluctuation threshold or the image-quality fluctuation threshold range. The enrolling unit 32 can be a read-write controller and so on. Alternatively, the enrolling unit 32 can be a memory per se.

The fingerprint enrolling apparatus of the implementation can be configured to execute the fingerprint enrolling method described in the foregoing implementations. The technical principle and technical effects produced by the fingerprint enrolling apparatus are similar with that of the fingerprint enrolling method and therefore are not described herein again.

The fingerprint enrolling apparatus can be separated from a fingerprint sensor, or can be built-into a fingerprint sensor. The present disclosure is not limited thereto.

Exemplarily, on the basis of the implementation above, the image-quality fluctuation amplitude of fingerprint images of the user is a difference between the maximum and minimum values of image quality of the current fingerprint image and the historical fingerprint image.

Exemplarily, as one implementation the apparatus further includes a controlling unit 33.

The controlling unit 33 is configured to control the apparatus to enable a fingerprint acquiring device such as a fingerprint sensor, when the first determining unit 31 determines that the image-quality fluctuation amplitude exceeds the image-quality fluctuation threshold or the image-quality fluctuation threshold range. The fingerprint sensor can be enabled to acquire a fingerprint image, and the fingerprint image can be used as the current fingerprint image.

Exemplarily, as another implementation, the apparatus further includes a controlling unit 33 and a second determining unit 34.

The second determining unit 34 is configured to determine, after the enrolling unit 32 enrolls the current fingerprint image into the fingerprint database, whether the total number of fingerprint images of the user enrolled into the fingerprint database reaches a preset value.

The controlling unit 33 is configured to control the apparatus to disable the enrolling unit 32 based on a determination of the second determining unit 34 that the total number of the fingerprint images enrolled into the fingerprint database reaches the preset value, or control the apparatus to enable a fingerprint acquiring device based on a determination that the total number of the fingerprint images enrolled into the fingerprint database is less than the preset value. The fingerprint acquiring device can be a fingerprint sensor, which can be enabled to acquire a fingerprint image, and the fingerprint image can be used as the current fingerprint image.

Exemplarily, based on the above-mentioned implementations, the image quality is determined based on an average value of grayscale or an average variance of grayscale corresponding to the fingerprint image.

The fingerprint enrolling apparatus of the foregoing implementations can be configured to perform the fingerprint enrolling method described in the aforementioned implementations. The technical principle and technical effects produced by the fingerprint enrolling apparatus are similar with that of the fingerprint enrolling method and therefore are not described herein again.

Fourth Implementation

Figure 4:
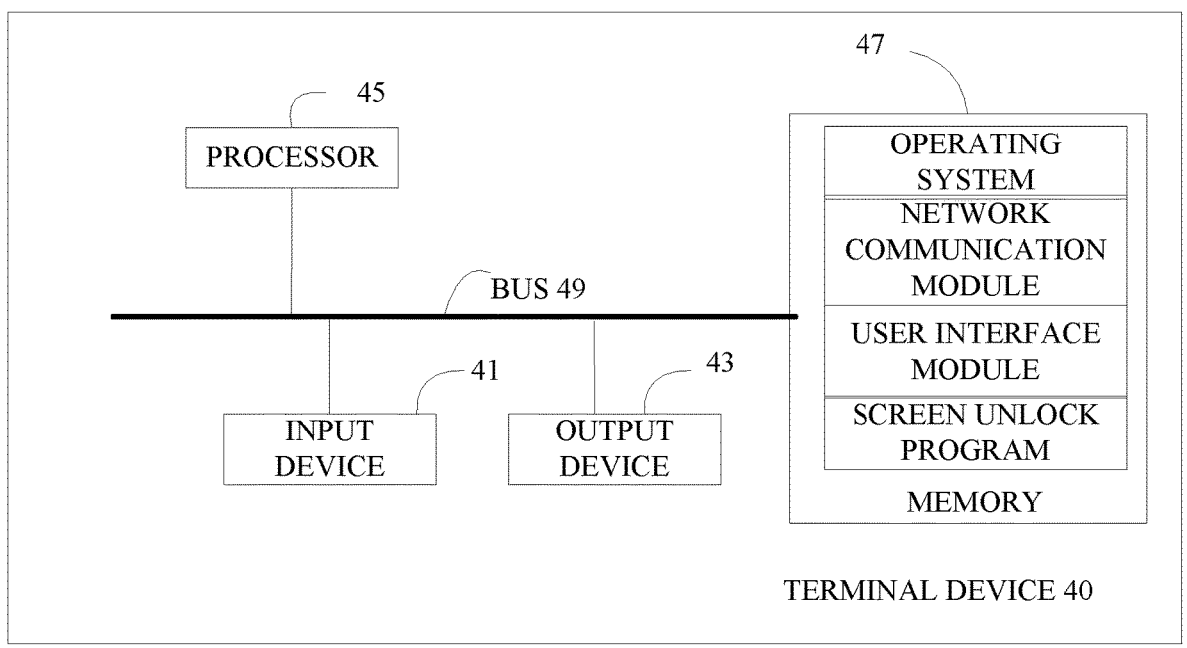
FIG. 4 is a schematic structural diagram illustrating a terminal device according to a fourth implementation of the present disclosure.

A terminal device is provided in this implementation. As illustrated in FIG. 4, the terminal device 40 includes at least one input device 41, at least one output device 43, at least one processor 45 such as a central processing unit (CPU), and a memory 47. The input device, the output device, the processor, and the memory are connected via a bus 49. For ease of explanation, only one input device, one output device, and one processor are illustrated in the figure.

The input device 41 can be a fingerprint input module, a physical keyboard, a mouse, or the like. The fingerprint input module can be a fingerprint sensor.

The output device 43 can be a display screen.

The memory 47 can be a high-speed random access memory (RAM) or a non-volatile memory such as a disk memory. The memory 47 is configured to store a group of program codes. The input device 41, output device 43, and the processor 45 are configured to invoke the program codes stored in the memory 47 to execute the following operations. The memory 47 may have an operating system, a network communication module, a user interface module, and the like stored therein. The memory 47 may have other programs such as a screen unlock program stored therein.

The term "module" may be used to refer to one or more physical or logical components or elements of a system. In some embodiments, a module may be a distinct circuit, while in other embodiments a module may include a plurality of circuits.

The processor 45 is configured to execute the program codes to determine, according to image quality of a current fingerprint image of a user currently acquired and image quality of a historical fingerprint image of the user previously acquired, whether an image-quality fluctuation amplitude of fingerprint images of the user exceeds a preset image-quality fluctuation threshold or image-quality fluctuation threshold range.

The processor 45 is configured to execute the program codes to enroll the current fingerprint image into the memory 47 when the image-quality fluctuation amplitude does not exceed the image-quality fluctuation threshold or the image-quality fluctuation threshold range.

The terminal device 40 can execute any fingerprint enrolling method of the implementations of the disclosure and thus can obtain the advantageous effects that can be achieved by any fingerprint enrolling method of the implementations. Reference can be made to the foregoing implementations for details.

According to still a further implementation, a non-transitory computer-readable storage medium is provided. The non-transitory computer-readable storage medium includes executable instructions that, when executed by a processor, facilitate performance of operations of the foregoing fingerprint enrolling methods. For specific details, reference can be made to the foregoing description and will not be repeated herein again.

It should be noted that the above are exemplary implementations and applied technical principles of the present disclosure. Those skilled in the art should understand that the present disclosure is not limited to the specific implementations described herein, and various changes, modifications, and substitutions can be made by those skilled in the art without departing from the scope of the present disclosure. Although has been described in detail by way of implementations, the present disclosure is not limited to the above implementations and other equivalent implementations may be obtained without departing from the present disclosure. The scope of the present disclosure should be determined by the appended claims.

What is claimed is:

1. A method for enrolling fingerprint, comprising:
   determining, according to image quality of a current fingerprint image of a user currently acquired and image quality of a historical fingerprint image of the user previously acquired, whether an image-quality fluctuation amplitude of fingerprint images of the user exceeds a preset image-quality fluctuation threshold or image-quality fluctuation threshold range; and
   enrolling the current fingerprint image into a fingerprint database based on a determination that the image-quality fluctuation amplitude does not exceed the image-quality fluctuation threshold or the image-quality fluctuation threshold range, wherein the image-quality fluctuation amplitude of fingerprint images of the user comprises a difference between the maximum and minimum values of the image quality of the current fingerprint image and the image quality of the historical fingerprint image.

2. The method of claim 1, further comprising:
   acquiring a fingerprint image based on a determination that the image-quality fluctuation amplitude exceeds the image-quality fluctuation threshold or the image-quality fluctuation threshold range; and
   using the fingerprint image acquired as the current fingerprint image.

3. The method of claim 1, further comprising:
   after the enrolling the current fingerprint image into the fingerprint database, determining whether the total number of fingerprint images of the user enrolled into the fingerprint database reaches a preset value;
   ending the enrolling based on a determination that the total number reaches the preset value; and
   acquiring a fingerprint image based on a determination that the total number is less than the preset value, wherein the fingerprint image acquired is used as the current fingerprint image.

4. The method of claim 1, wherein the image quality is determined based on an average grayscale value corresponding to the fingerprint image or an average grayscale variance corresponding to the fingerprint image.

5. The method of claim 1, further comprising:
   before the enrolling the current fingerprint image into the fingerprint database, presetting an image acquiring threshold of the fingerprint database; and
   setting the image acquiring threshold to be a preset value.

6. The method of claim 1, wherein the historical fingerprint image comprises one or more fingerprint images acquired before acquiring the current fingerprint image.

7. An apparatus for enrolling fingerprint, comprising:
   a first determining unit, configured to determine, according to image quality of a current fingerprint image of a user currently acquired and image quality of a historical fingerprint image of the user previously acquired, whether an image-quality fluctuation amplitude of fingerprint images of the user exceeds a preset image-quality fluctuation threshold or image-quality fluctuation threshold range; and
   an enrolling unit, configured to enroll the current fingerprint image into a fingerprint database when the first determining unit determines that the image-quality fluctuation amplitude does not exceed the image-quality fluctuation threshold or the image-quality fluctuation threshold range, wherein the image-quality fluctuation amplitude of fingerprint images of the user comprises a difference between the maximum and minimum values of the image quality of the current fingerprint image and the image quality of the historical fingerprint image.

8. The apparatus of claim 7, further comprising:
   a controlling unit, configured to control the apparatus to enable a fingerprint sensor when the first determining unit determines that the image-quality fluctuation amplitude exceeds the image-quality fluctuation threshold or the image-quality fluctuation threshold range, wherein the fingerprint sensor is configured to acquire the current fingerprint image.

9. The apparatus of claim 7, further comprising:
   a second determining unit, configured to determine, after the enrolling unit enrolls the current fingerprint image into the fingerprint database, the total number of fingerprint images of the user enrolled into the fingerprint database reaches a preset value; and
   a controlling unit, configured to control the apparatus to disable the enrolling unit when the second determining unit determines that the total number of the fingerprint images enrolled into the fingerprint database reaches the preset value, or control the apparatus to enable a fingerprint sensor when the second determining unit determines that the total number of the fingerprint images enrolled into the fingerprint database is less than the preset value, wherein the fingerprint sensor is configured to acquire the current fingerprint image.

10. The apparatus of claim 7, wherein the image quality is determined based on an average grayscale value corresponding to the fingerprint image or an average grayscale variance corresponding to the fingerprint image.

11. The apparatus of claim 7, wherein the historical fingerprint image comprises one or more fingerprint images acquired before acquiring the current fingerprint image.

12. A terminal device, comprising:
a memory, configured to store executable program codes; and
a processor, coupled with the memory, wherein the processor is configured to invoke the executable program codes stored in the memory to:
acquire a current fingerprint image of a user;
determine, according to image quality of the current fingerprint image and image quality of a historical fingerprint image of the user previously acquired, whether an image-quality fluctuation amplitude of fingerprint images of the user exceeds a preset image-quality fluctuation threshold or image-quality fluctuation threshold range; and
enroll the current fingerprint image into a fingerprint database based on a determination that the image-quality fluctuation amplitude does not exceed the image-quality fluctuation threshold or the image-quality fluctuation threshold range, wherein the image-quality fluctuation amplitude of fingerprint images of the user comprises a difference between the maximum and minimum values of the image quality of the current fingerprint image and the image quality of the historical fingerprint image.

13. The terminal device of claim 12, wherein the processor is further configured to execute program codes to:
return to acquiring the current fingerprint image based on a determination that the image-quality fluctuation amplitude exceeds the image-quality fluctuation threshold or the image-quality fluctuation threshold range.

14. The terminal device of claim 12, wherein the processor is further configured to execute program codes to:
after enrolling the current fingerprint image into the fingerprint database, determine whether the total number of fingerprint images of the user enrolled into the fingerprint database reaches a preset value; and
end the enrolling based on a determination that the total number reaches the preset value; and
return to acquiring the current fingerprint image based on a determination that the total number is less than the preset value.

15. The terminal device of claim 12, wherein the processor is further configured to execute program codes to:
before enrolling the current fingerprint image into the fingerprint database, preset an image acquiring threshold of the fingerprint database; and
set the image acquiring threshold to be a preset value.

16. The terminal device of claim 12, wherein the image quality is determined based on an average grayscale value or an average grayscale variance corresponding to the fingerprint image.

17. The terminal device of claim 12, wherein the historical fingerprint image comprises one or more fingerprint images acquired before acquiring the current fingerprint image.

* * * * *